(12) United States Patent
Wilson, Sr.

(10) Patent No.: US 11,807,150 B2
(45) Date of Patent: Nov. 7, 2023

(54) MOBILE PERFORMANCE STAGE

(71) Applicant: Thomas Randolph Wilson, Sr., Port Huron, MI (US)

(72) Inventor: Thomas Randolph Wilson, Sr., Port Huron, MI (US)

( * ) Notice: Subject to any disclaimer, the term of this patent is extended or adjusted under 35 U.S.C. 154(b) by 0 days.

(21) Appl. No.: 17/656,350

(22) Filed: Mar. 24, 2022

(65) Prior Publication Data

US 2022/0212590 A1 Jul. 7, 2022

Related U.S. Application Data

(63) Continuation of application No. 16/946,895, filed on Jul. 10, 2020, now Pat. No. 11,292,379.

(60) Provisional application No. 62/872,435, filed on Jul. 10, 2019.

(51) Int. Cl.
*B60P 3/025* (2006.01)
*B60J 7/08* (2006.01)

(52) U.S. Cl.
CPC ............ *B60P 3/025* (2013.01); *B60J 7/08* (2013.01)

(58) Field of Classification Search
CPC .......... B60P 3/025; B60P 3/0252; B60P 3/34; B60P 3/42; B60J 7/08
USPC ........................ 296/10, 172, 173, 175, 176
See application file for complete search history.

(56) References Cited

U.S. PATENT DOCUMENTS

| | | | | |
|---|---|---|---|---|
| 4,135,755 A | * | 1/1979 | Steffens | B60P 3/34 296/172 |
| 4,720,945 A | * | 1/1988 | Berranger | B60P 3/0252 52/79.5 |
| 5,152,109 A | * | 10/1992 | Boers | E04H 3/24 296/26.02 |
| 7,918,053 B2 | * | 4/2011 | Bucher | E04B 1/3431 52/69 |
| 8,544,213 B2 | * | 10/2013 | Allison | B60P 3/0252 52/79.5 |
| 8,978,311 B1 | * | 3/2015 | Uhl | E04H 3/26 52/79.5 |
| 2005/0120639 A1 | * | 6/2005 | Bucher | E04B 1/3444 52/64 |

FOREIGN PATENT DOCUMENTS

| EP | 1279775 A2 | * | 1/2003 | ......... E04B 1/34305 |
|---|---|---|---|---|
| EP | 1538270 A1 | * | 6/2005 | ........... E04B 1/3431 |

* cited by examiner

*Primary Examiner* — Hilary L Gutman
(74) *Attorney, Agent, or Firm* — Squire Patent Consulting & IP Law LLC; Brendan E. Squire

(57) ABSTRACT

A mobile performance stage is configurable between a compact transport condition to a performance condition with expanding deck wings and expanding canopy wings. The deck wings are carried directly on top of the main trailer deck and roll on tracks to deploy to the performance condition. The roof canopy includes a main roof element and two foldable roof wings. The roof wings pivot from fully open to a fully closed stowed condition below the main roof element to reduce the height of the stage when transported. Lift columns are hinged to reduce height. The roof wings may also be stored in a vertical position to provide side walls for a cargo trailer configuration. The roof may also be completely removed to form a deck only stage.

18 Claims, 5 Drawing Sheets

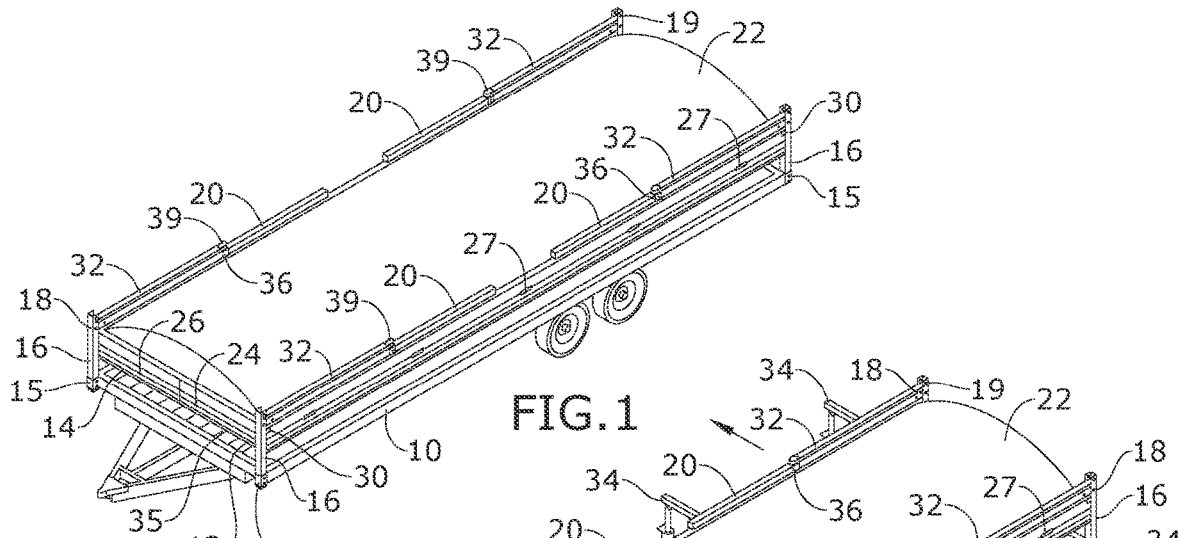
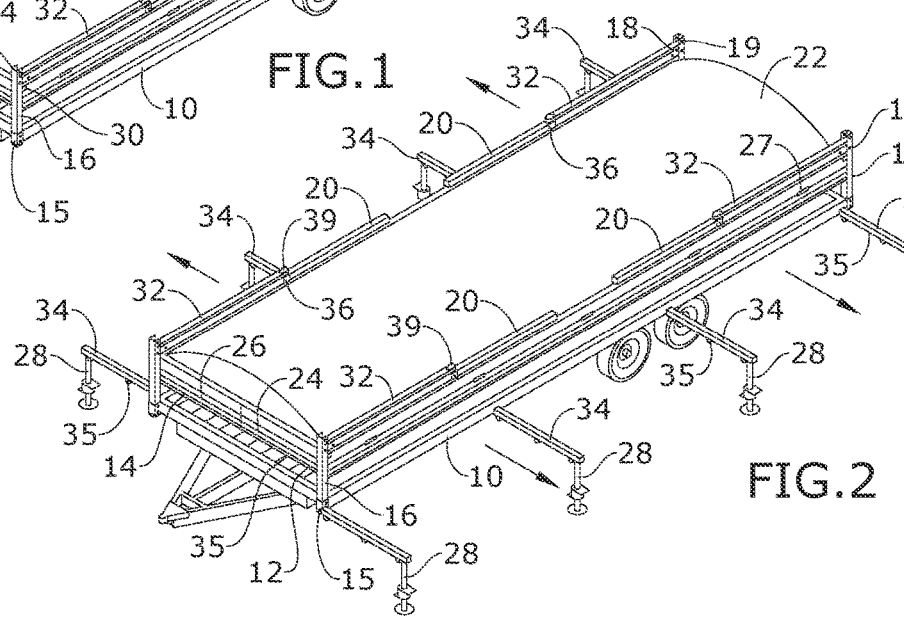
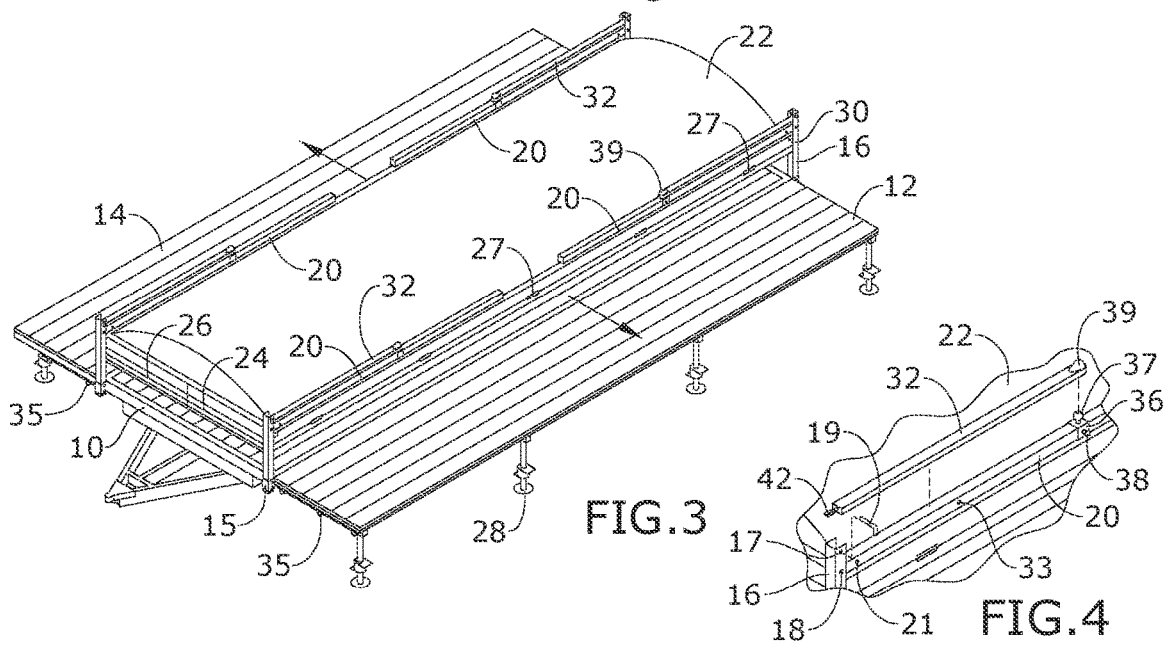

MOBILE PERFORMANCE STAGE

CROSS-REFERENCE TO RELATED APPLICATION

This application is a continuation of U.S. patent application Ser. No. 16/946,895, filed Jul. 10, 2020, and claims the benefit of priority of U.S. provisional application No. 62/872,435, filed Jul. 10, 2019, the contents of which are herein incorporated by reference.

BACKGROUND OF THE INVENTION

The present invention relates to performance stages, and more particularly to mobile performance stages.

Current mobile stages are very tall as a trailer. Tall trailers having a high profile reduce fuel economy, can hit overhead obstructions, and can blow over on the road in gusty conditions. They can only be moved indoors through full commercial overhead doors, and they cannot be stored in buildings with low overhead doors. The roof systems are heavy, often with fiberglass panels. Hydraulic systems and large steel frames are needed to lift the roof. The heavy stage systems and high profile mean they must be towed by large trucks. The deck wings are usually hinge mounted to the main frame. The deck wings and/or the roof wings are normally stored in a vertical position which increases the height as a trailer.

In addition, because current mobile stage roof systems cannot be removed from the trailer system, it cannot be set up as a deck only stage, and it cannot be used as a deck-over trailer.

Conventional mobile stages can be used as stage or a trailer. This invention converts to multiple configurations. As a stage this invention can be used as a standard mobile stage or a deck only stage. As a trailer this invention can be used as a low profile trailer, or an enclosed cargo trailer, or a deck-over trailer.

As can be seen, there is a need for an improved mobile stage apparatus.

SUMMARY OF THE INVENTION

In one aspect of the present invention, a mobile performance stage is disclosed. The mobile performance stage includes a performance deck supported by a frame that is carried by a plurality of ground transport wheels. A plurality of deck wing extensions are selectively configurable between a stowed condition, supported atop the performance deck, and a deployed condition, extending from a lateral side of the performance deck. A roof canopy has a main roof element that is dimensioned to cover the performance deck. A plurality of roof wings are selectively extensible from the main roof element between the stowed condition, nested subjacent to the main roof element, and a deployed condition, extending from the main roof element and covering the plurality of deck wing extensions. A plurality of hinged upright frame members are coupled to the frame. A sleeve coupling between the main roof element and the plurality of hinged upright frame members are configured to selectively elevate and lower the roof canopy.

In some embodiments, a roof wing support is coupled to each of a first end and a second end of the main roof element. The roof wing support is selectively extensible between the stowed condition and an extended position. In the extended position, the roof wing support retains the plurality of roof wings in the deployed condition.

In some embodiments, a multi-bar is removably coupled to the plurality of hinged upright frame members. A ball and a socket coupling may be provided between the sleeve and a proximal end of the multi-bar. A pin may be provided at a distal end of the multi-bar configured to engage with an opening at a lateral edge of the plurality of roof wings.

In some embodiments, a ground wheel and a caster are removably coupled to a distal end of multi-bar. The multi-bar may then be removably attached to the main roof element to support the roof canopy in a detached condition from the mobile performance stage.

In some embodiments, a plurality of roller track bars are removably coupled to and extending laterally from a side edge of the frame. A wing support leg is disposed at a distal end of each of the plurality of roller track bars. The wing support leg is vertically adjustable to accommodate for a variation in a ground surface on which the mobile performance stage is deployed.

In some embodiments a multi-bar is removably coupled between the main roof element and the frame to support the plurality of roof wings in a vertical orientation to form a sidewall of a cargo trailer configuration.

In other embodiments, a cable coupled to the sleeve and a winch is configured and operatively attached to the cable to selectively elevate and lower the main roof element.

In other aspects of the invention, the mobile performance stage includes a performance deck supported by a frame carried by a plurality of ground transport wheels. A plurality of deck wing extensions are selectively configurable between a stowed condition, supported atop the performance deck, and a deployed condition, extending from a lateral side of the performance deck. A roof canopy has a main roof element dimensioned to cover the performance deck and a plurality of roof wings pivotally coupled to the main roof element. The plurality of roof wings are selectively positioned between the stowed condition, nested subjacent to the main roof element, a deployed condition, extending from the main roof element and covering the plurality of deck wing extensions, and a cargo trailer condition extending between the main roof element and the frame to define a sidewall of a cargo trailer.

These and other features, aspects and advantages of the present invention will become better understood with reference to the following drawings, description and claims.

BRIEF DESCRIPTION OF THE DRAWINGS

FIG. 1 is a front elevation view (in direction of travel) of the mobile performance stage in the low profile condition.

FIG. 2 is a front elevation view of the mobile performance stage with the deck wing support tracks extended and supported by adjustable legs.

FIG. 3 is a front elevation view of the mobile performance stage with the deck wings fully extended.

FIG. 4 is a partial view showing the multi bar and sliding coupling.

DETAILED DESCRIPTION OF THE INVENTION

Figure 5:
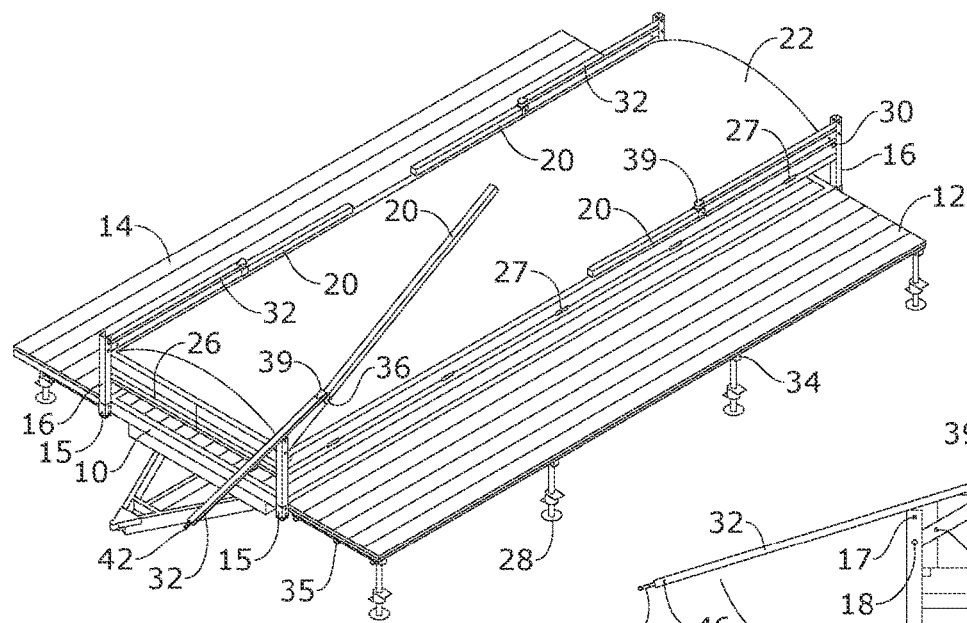
FIG. 5 is a view of the multi bar lifting one of the support columns.

The following detailed description is of the best currently contemplated modes of carrying out exemplary embodiments of the invention. The description is not to be taken in a limiting sense but is made merely for the purpose of illustrating the general principles of the invention.

Broadly, embodiments of the present invention provide a system method and apparatus for providing a mobile performance stage. In The mobile performance stage is configurable from a collapsed and condensed transport configuration to an elevated and extended performance stage configuration. The mobile performance stage is also configurable in a cargo transport configuration in which additional equipment may be carried by the trailer within an enclosed spaced.

The mobile performance stage converts to a trailer with all of the stage components; deck wings 12, 14, roof wings 24, 26, main roof 22, and frame stored horizontally directly on top of the main trailer 10 and below the main roof 22, i.e. in a sandwiched, nested configuration. In the transport configuration, Shown in FIG. 1, the towing height of the trailer is reduced from more than 10 or more feet of a typical mobile stage to less than 7 feet. The mobile performance stage of the present invention provides significant height and weight reduction over alternative mobile performance stages.

The mobile performance stage includes a trailer mounted performance deck 10 that is supported by a trailer frame and a plurality of ground transport wheels. A first platform wing 12 and a second platform wing 14 are selectively extensible between a stowed condition, resting atop the performance deck 10 and an extended position to provide an elevated performance stage. A plurality of roller track bars 34 are coupled to and extend laterally from a side edge of the trailer frame. A distal end of the roller track bars 34 is supported by a deck wing support leg 28 that is vertically adjustable to accommodate for variations in a ground surface on which the mobile performance stage is established.

With the roller track bars 34 positioned as shown in reference to FIG. 2, the first platform wing 12 and the second platform wing 14 are slidable over the performance deck 10 and supported by the roller track bars 34 such that an upper surface of the performance deck 10 and the first platform wing 12 and the second platform wing 14 are deployed in a common plane, as seen in reference to FIG. 3. The first platform wing 12 and the second platform wing 14 may be carried by rollers 35 to facilitate repositioning between the stowed and the deployed conditions.

A column support sleeve 15 is coupled to the frame and disposed at corners of the performance deck 10 and is adapted to receive a lower hinged column support 16. As seen in the detail view of FIG. 4, a locking pin hole 17 is defined in the lower column support 16. The lower hinged column support 16 is coupled to the column support sleeve 15 at a pivot 18. The locking pin hole 17 in the lower hinged column support 16 and the upright frame members 20 are configured to receive a locking pin 19 to retain the lower hinged column support 16 and the upright frame members 20 in a vertical orientation.

Figure 6:
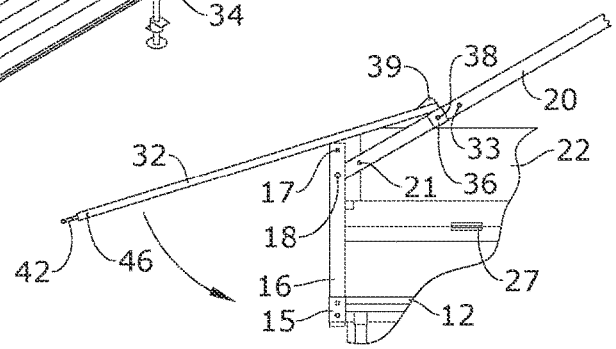
FIG. 6 is a view of the lever motion of the multi bar to lift the support column.
Figure 9:
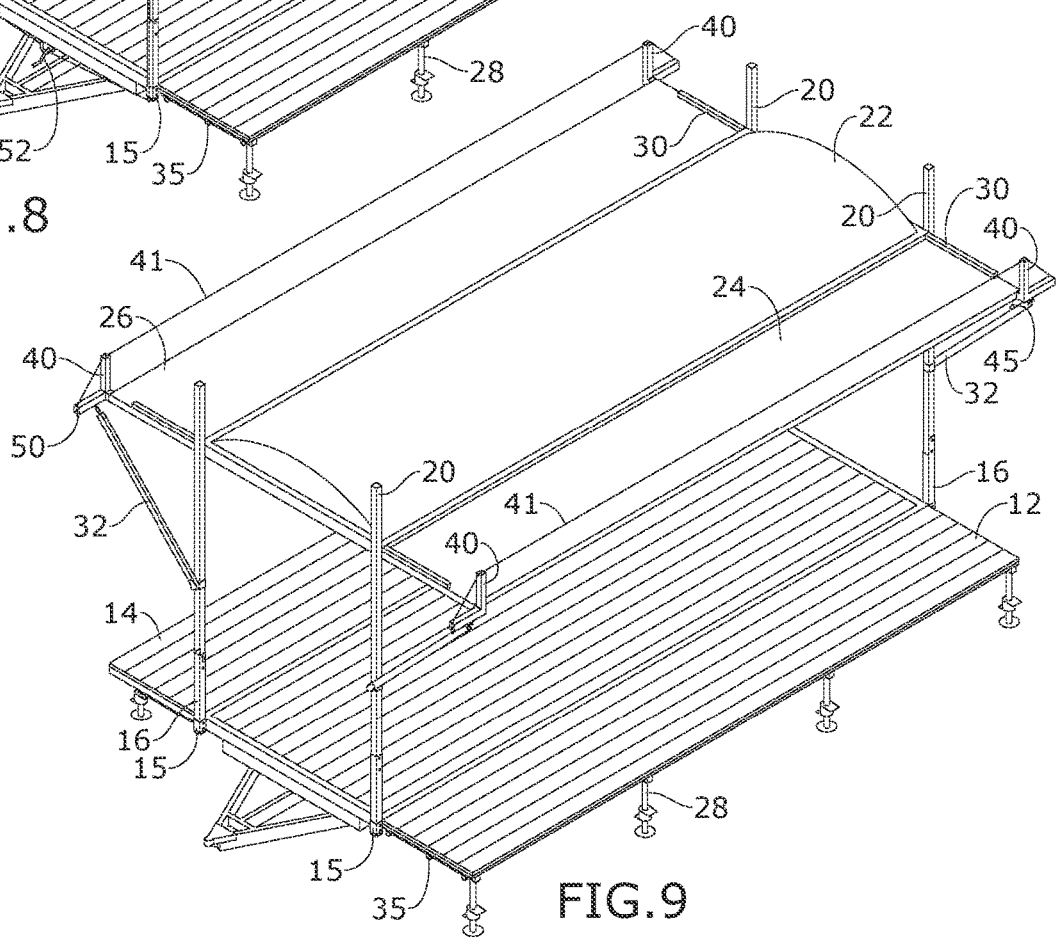
FIG. 9 is a front elevation of the stage fully set up. The multi bars are in position as support arms between the roof wing and the sliding ball coupling. The heavy fly brackets with support cables between them are shown.
Figure 10:
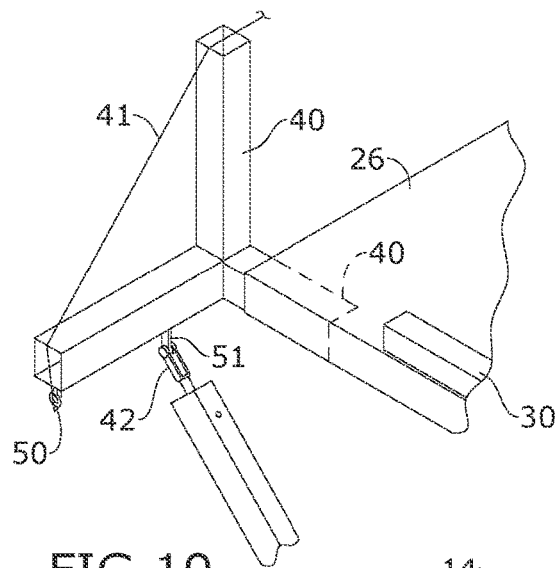
FIG. 10 is a detail view of the connection between the roof wing and the heavy fly bracket and the multi bar.
Figure 12:
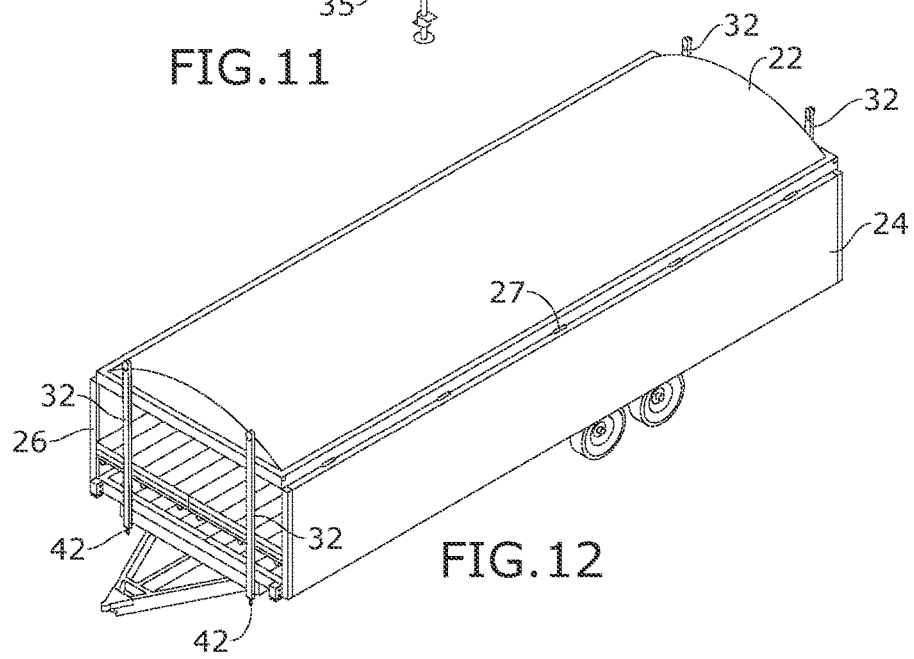
FIG. 12 is a front elevation view of the mobile performance stage in the cargo trailer mode. The multi bars are the support posts.
Figure 15:
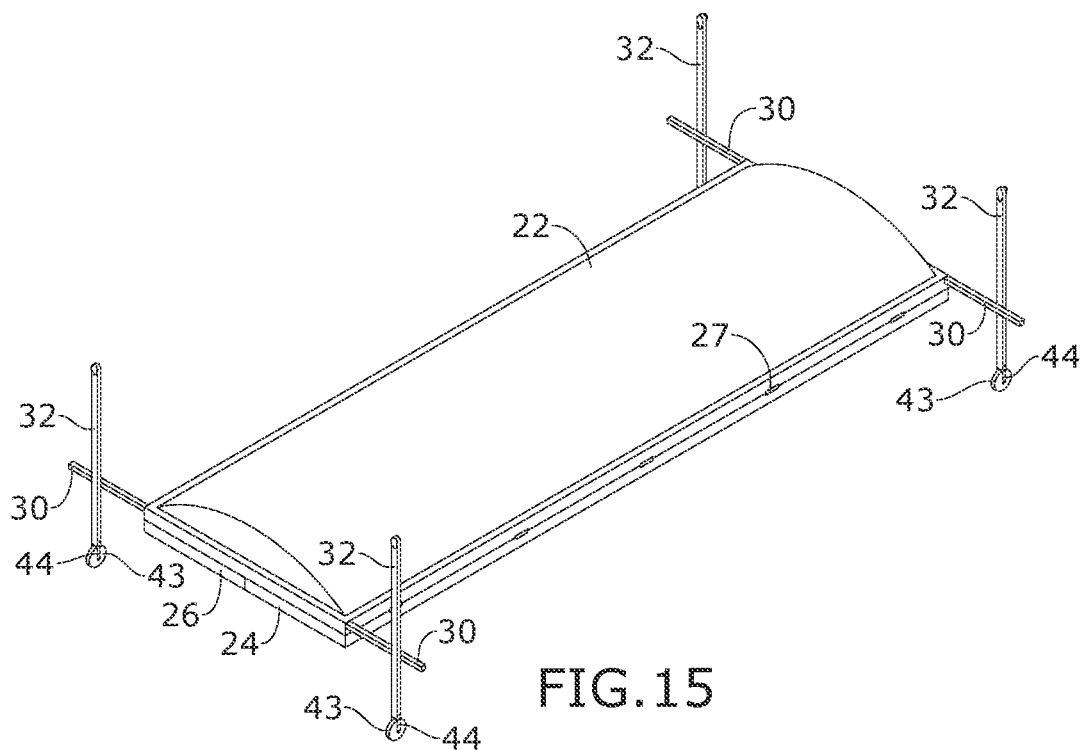
FIG. 15 is a front elevation of the roof with the roof wings stored, being supported by the multi bars. The trailer and deck are removed to be used for the deck stage mode.

A multi-bar 32 is pivotally coupled to the upright frame members 20. A ball 37 extends from a sleeve 36 A socket 39 at a proximal end of a multi bar 32 connects the multi-bar 32 to the sleeve 36. The multi-bar 32 solves several problems of mobile stages. The multi-bars 32 may be used as pry-bars to raise and elevate the upright frame members 20 into place, shown in FIGS. 5 and 6. The multi bars 32 are also used as support braces under the left and the right roof wing extensions 24, 26, as seen in reference to FIG. 9. The multi-bars 32 may also be used as ground legs to support the main roof 22 when removed from the trailer, as seen in FIG. 15. The multi-bars 32 are also utilized as a medium height support column for configuring the mobile performance stage in the cargo trailer mode, shown in FIG. 12. The sliding sleeves 36 and ball couplers are used to convert the plane of motion according to the position of the upright frame members 20 to either lift the upright frame members 20 or to elevate and support the roof element 22.

The main roof element 22 is secured to the upright frame members 20 by the sleeves 36 and the ball coupling. A roof wing support 30 is coupled to each of a first end and a second end of the main roof element 22. The roof wing support 30 may be telescopically adjusted, such that in a stowed condition the roof wing support 30 has a width corresponding to the main roof element 22. When deployed, the roof wing support 30 retains the first roof wing 24 and the second roof wing 26 in an elevated condition. The roof wing support 30 is adjustable to vary a pitch of one or more of the first roof wing 24 or the second roof wing 26 relative to the main roof element 22.

The roof canopy of the mobile performance stage includes a one-piece main roof 22 element, a first roof wing 24, and a second roof wing 26. A hinge assembly 27 couples the first roof wing 24 and the second roof wing 26 to the main roof 22 element. The roof canopy is supported by a plurality of upright frame members 20 removably coupled to the trailer frame and can be easily removed when desired.

Figure 7:
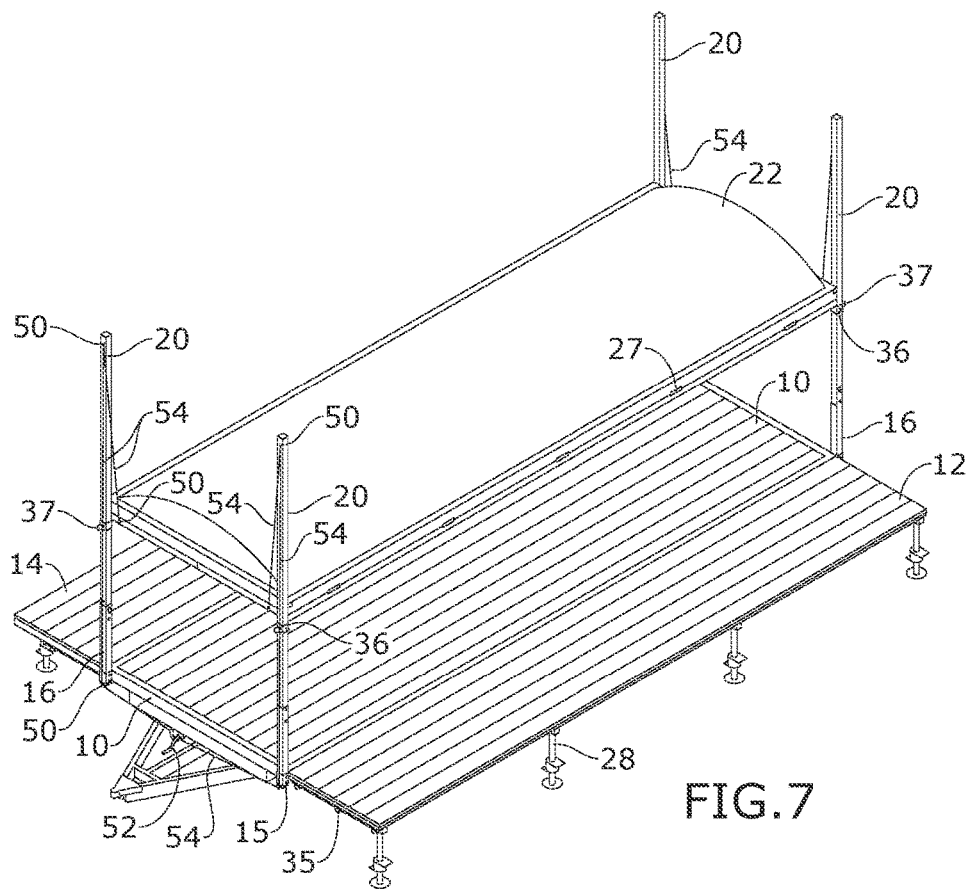
FIG. 7 is a view of the mobile performance stage with all support columns raised, and the roof partially raised.
Figure 8:
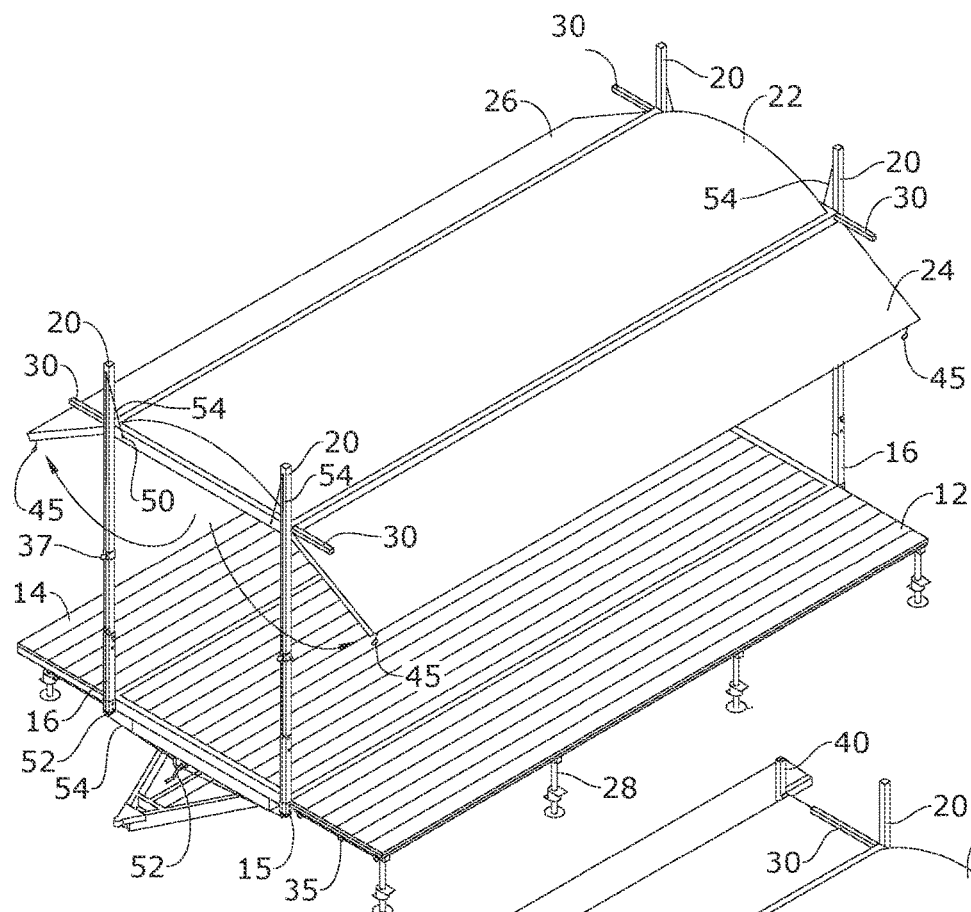
FIG. 8 is a front elevation view with the roof fully raised. The roof extension wings are partially deployed. The telescoping roof wing supports are shown ready for the roof wings to be attached.

The roof canopy is raised partly, so the left and the right roof wings 24, 26 can be released from the stored position below the main roof element 22 and swung 180 degrees to a fully open condition via straps 45, where the left and the right roof wings 24, 26 are held in place by the multi-bar 32 and roof wing support 30. Once the deck and roof extension wings 24, 26 are fully opened, the entire roof canopy is hoisted using a cable 54 and a winch 52 to lift the roof canopy on the upright frame members 20, as seen in reference to FIGS. 7-9.

Figure 11:
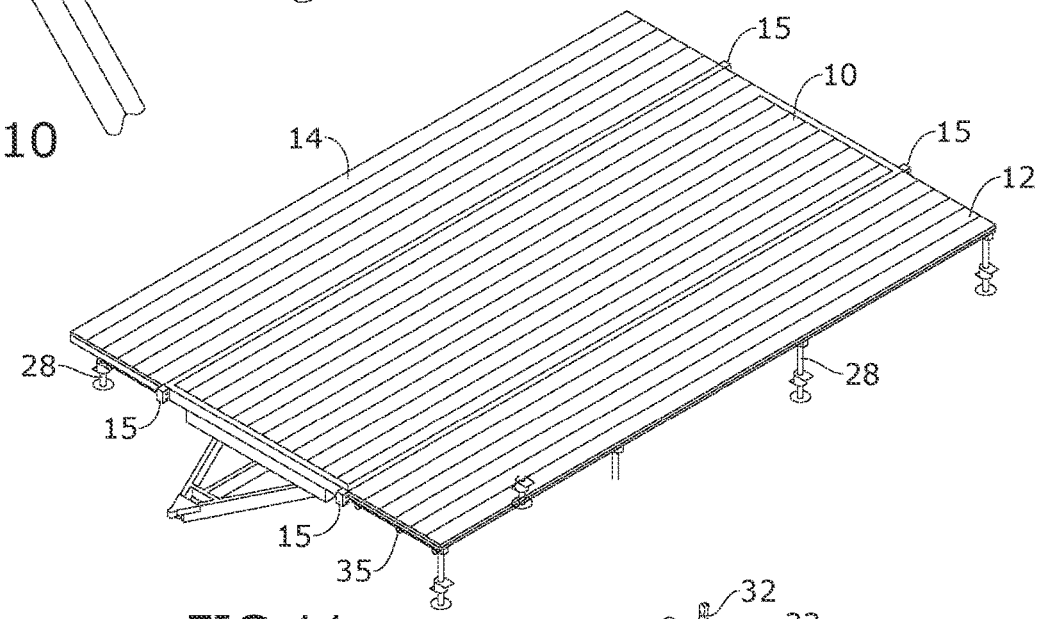
FIG. 11 is a front elevation view of the deck only configuration.
Figure 13:
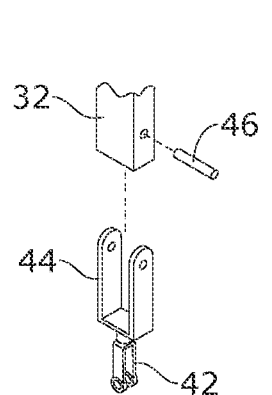
FIG. 13 is a detail of the clevis used to support the roof wing on the end of the multi bar.
Figure 14:
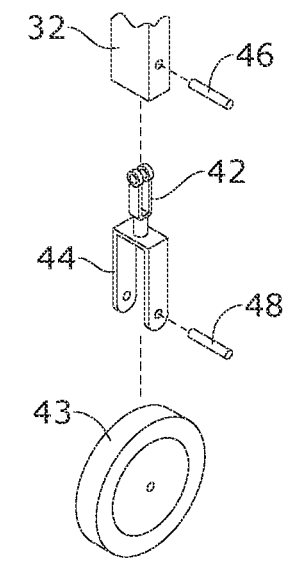
FIG. 14 is a detail of the clevis in the reversed position to accept the wheel.

When the main roof element 22 is removed, such as shown in reference to FIG. 11, the trailer and extensible deck wings 12, 14 (now approximately 36" tall) can be moved into place and used where a performance stage is normally used. The main roof element 22, the first roof wing 24 and the second roof wing 26 may be temporarily stored on site by attachment of a ground support wheel 43 and caster 44 to the multi-bar 32 and coupling the multi-bar 32 with the roof wing supports 30, such as shown in reference to FIG. 15. An example of this is inside a large tent where the roof of the tent may be too low for a conventional stage with the roof canopy installed. The versatility of the multi-bar 32 is provided by removably and reversibly coupling the caster 44 and a clevis 42 with the multi-bar 32, via a retaining pin 46 received through the multi-bar 32 and an axle pin 48 received through the caster 44 and wheel 43, as shown in reference to FIGS. 13 and 14.

To return from a stage to a trailer the process is mostly reversed, except the deck wings 12, 14 are lifted up and rolled back onto the performance deck 10. A deck recovery system is used. The roof is lowered so the deck extensions can be attached via a linkage. When the roof is partly lifted, the deck wings 12, 14 can be lifted, whereby they can be pushed back into place on top of the performance deck 10 of the main trailer using their rollers.

Beginning with the trailer leveled, the mobile performance stage may be assembled according to the following steps:

1. Roll deck extension wings 12, 14 horizontally into position on the roller track bars 34, supported with the deck wing support legs 28 in place. The first platform wing 12 and the second platform wing 14 drop onto pockets along the edge of the performance deck 10 of the main trailer frame. This creates a wide and flat mobile performance stage deck.

2. Lift lower hinged column support 16, 20 to a vertical position at each of the four corners of the trailer.

3. Connect the lift cable 41 from the post to the roof canopy (4 corners).

4. Partly raise the roof canopy and disconnect the first roof wing 24 and the second roof wing 26 from their stored position. Rotate the first roof wing 24 and the second roof wing 26 180 degrees outward then secure to the roof wing support 30 in the extended position (above the deck wing from previous step).

5. Install any accessories (stage lights/banners/speakers), which may be mounted and carried on a fly bracket 40. The fly bracket 40 carries a cable 41 which is coupled and tensioned with an eyebolt 50. When the fly bracket 40 is installed, the clevis 42 at the end of multi-bar 32 couples with a mounting lug 51 extending from the fly bracket 40.

6. Raise the roof canopy to full stage height.

7. Secure as needed.

8. If the mobile performance stage is to be used as a deck only stage, ground standing frames, provided by the multi-bar 32, wheel 43 and casters 44 are used to lift the entire roof canopy off of the stage. Then the main trailer with deck wings can be moved and set up at a different location.

If cargo (musical gear for instance) needs to be hauled, the lower hinged column supports 16 are removed and replaced by the multi-bars 32. The roof canopy is then partly lowered, and the roof extension wings 24, 26 are stored vertically to form the sidewalls of the cargo trailer.

In some embodiments, the invention could also include powered hydraulic systems that are used to raise the roof canopy and move the deck wings 12, 14 for set up. However, the complexity of hydraulic systems, and associated frame work are not needed due to the light weight construction and simple mechanical motions.

In a non-limiting embodiment of the invention, the width of this stage will double the width of a trailer. For example, an 8' wide performance deck 10 carried by the trailer becomes a 16' wide stage. Alternate designs will be able to make the stage up to 3 times the trailer width to become a 24' wide stage. The main trailer frame may be formed of welded steel or aluminum frame members. Placement of water tanks within the frame can be used as a drainable ballast.

It should be understood, of course, that the foregoing relates to exemplary embodiments of the invention and that modifications may be made without departing from the spirit and scope of the invention as set forth in the following claims.

What is claimed is:

1. A mobile performance stage configurable as a low-profile trailer for transport of the mobile performance stage, comprising:
    a performance deck supported by a frame carried by a plurality of ground transport wheels;
    a plurality of deck wing extensions selectively configurable between a stowed condition, stored horizontally for trailer profile reduction, atop the performance deck, and a deployed condition, extending from a lateral side of the performance deck;
    a roof canopy having a main roof element dimensioned to cover the performance deck, the roof canopy selectively positionable between an elevated position and a lowered position;
    a plurality of roof wings selectively extensible from the main roof element between the deployed condition, extending from the main roof element and covering the plurality of deck wing extensions; and a cargo trailer condition, extending vertically between the main roof element and the frame to define a sidewall of a cargo trailer; and
    a plurality of upright frame members coupled with the frame to support the roof canopy in the deployed condition.

2. The mobile performance stage of claim 1, further comprising:
    a roof wing support coupled with each of the plurality of upright frame members and the plurality of roof wings the roof wing support supporting the plurality of roof wings in the deployed condition above the plurality of deck wing extensions.

3. The mobile performance stage of claim 1, further comprising:
    a multi-bar removably coupled to the plurality of upright frame members.

4. The mobile performance stage of claim 3, further comprising:
    a ball and a socket coupling between a sleeve slidably attached to the upright frame member and a proximal end of the multi-bar.

5. The mobile performance stage of claim 3, further comprising
    a clevis at a distal end of the multi-bar configured to engage with a mounting lug to support the plurality of roof wings in the deployed condition.

6. The mobile performance stage of claim 3, further comprising:
    a caster removably coupled to a distal end of the multi-bar, and
    a proximal end of the multi-bar is removably attached to the main roof element to carry the roof canopy in a detached condition from the mobile performance stage.

7. The mobile performance stage of claim 1, further comprising:
    a plurality of roller track bars removably coupled to and extending laterally from a side edge of the frame; and
    a wing support leg disposed at a distal end of each of the plurality of roller track bars, the wing support leg vertically adjustable to accommodate for a variation in a ground surface on which the mobile performance stage is deployed.

8. The mobile performance stage of claim 1, further comprising:
a multi-bar removably coupled between the main roof element and the frame to support the roof canopy in the cargo trailer condition above the performance deck; and
the plurality of roof wings disposed in a vertical orientation to form the sidewall of the cargo trailer condition.

9. The mobile performance stage of claim 1, further comprising:
a sleeve coupled with the roof canopy, wherein the plurality of upright frame members are slidably carried in the sleeve;
a cable coupled to the sleeve; and
a winch configured operatively attached to the cable to selectively elevate and lower the main roof element along the plurality of upright frame members.

10. A mobile performance stage, comprising:
a performance deck supported by a frame carried by a plurality of ground transport wheels;
a plurality of deck wing extensions selectively configurable between a low profile stowed condition, supported atop the performance deck, and a deployed condition, extending from a lateral side of the performance deck;
a roof canopy having a main roof element dimensioned to cover the performance deck, the roof canopy selectively elevated to the deployed condition;
a plurality of upright frame members supporting the roof canopy above the performance deck in the deployed condition; and
a plurality of roof wings pivotally coupled to the main roof element, the plurality of roof wings selectively positioned between the deployed condition, extending from the main roof element of the roof canopy and covering the plurality of deck wing extensions, and a cargo trailer condition, extending vertically between the main roof element and the frame to define a sidewall of a cargo trailer; and
a multi-bar removably coupled to the plurality of upright frame members.

11. The mobile performance stage of claim 10, further comprising:
a roof wing support coupled with each of the plurality of upright frame members and the plurality of roof wings, the roof wing support supporting the plurality of roof wings in the deployed condition above the plurality of deck wing extensions.

12. The mobile performance stage of claim 10, further comprising:
a ball and a socket coupling between a sleeve attached to the roof canopy and a proximal end of the multi-bar.

13. The mobile performance stage of claim 10, further comprising
a clevis at a distal end of the multi-bar configured to engage with a mounting lug to support the plurality of roof wings in the deployed condition.

14. The mobile performance stage of claim 10, further comprising:
a caster removably coupled to a distal end of multi-bar, and
the multi-bar is removably attached to the main roof element to carry the roof canopy in a detached condition from the mobile performance stage.

15. The mobile performance stage of claim 10, further comprising:
a plurality of roller track bars removably coupled to and extending laterally from a side edge of the frame; and
a wing support leg disposed at a distal end of each of the plurality of roller track bars, the wing support leg vertically adjustable to accommodate for a variation in a ground surface on which the mobile performance stage is deployed.

16. The mobile performance stage of claim 10, further comprising:
a multi-bar removably coupled between the main roof element and the frame to support the plurality of roof wings in a vertical orientation to form the sidewall of the cargo trailer condition.

17. The mobile performance stage of claim 10, further comprising:
a sleeve attached to the roof canopy, wherein the plurality of upright frame members are slidably carried in the sleeve;
a cable coupled to the sleeve; and
a winch configured operatively attached to the cable to selectively elevate and lower the main roof element along the plurality of upright frame members.

18. The mobile performance stage of claim 10, wherein the roof canopy is removably coupled to the frame.

* * * * *